April 11, 1961    D. P. MARQUIS    2,978,886
UNIVERSAL JOINT
Filed Dec. 29, 1958
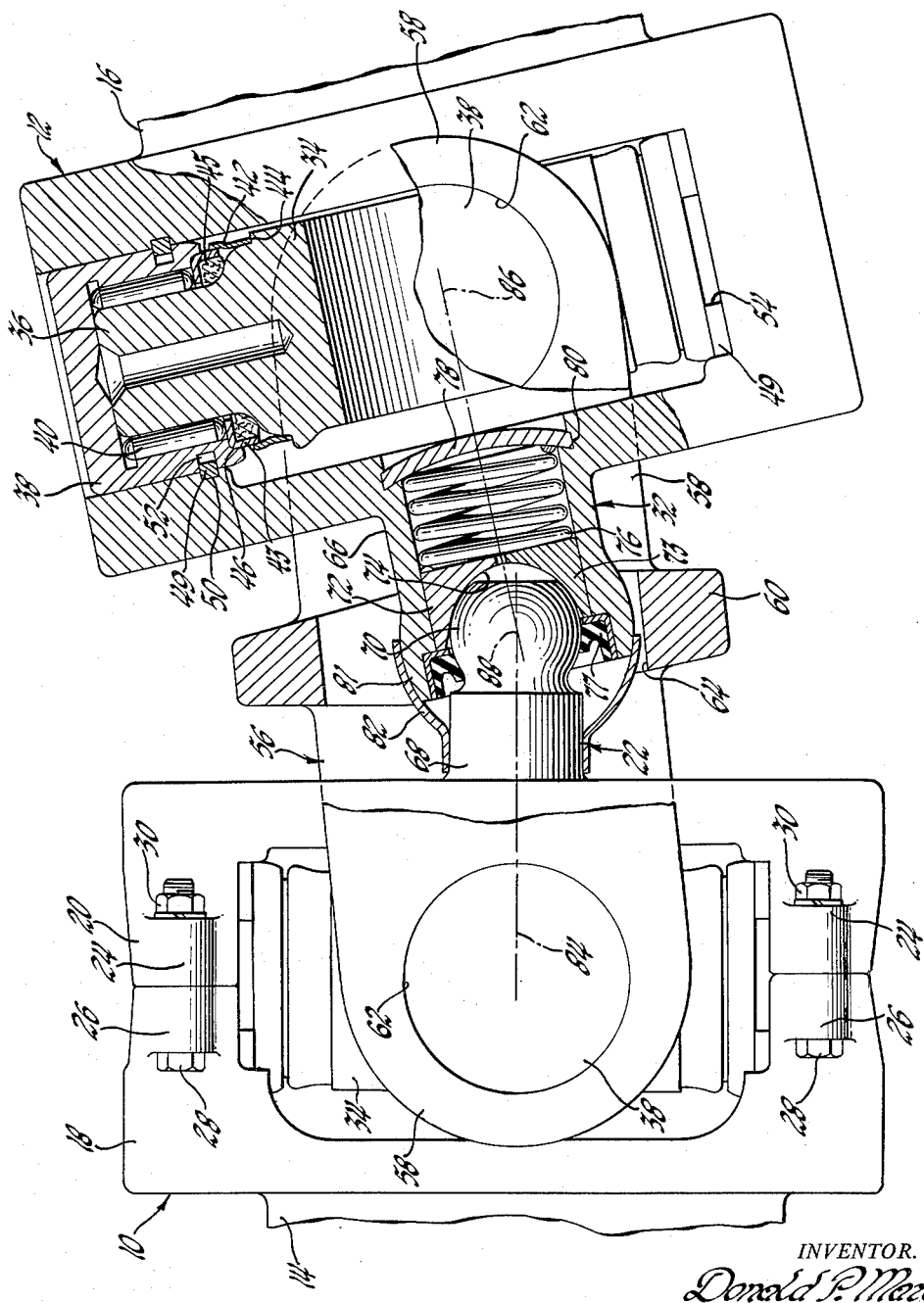
INVENTOR.
Donald P. Marquis
BY
L.D. Burch
ATTORNEY

United States Patent Office 2,978,886
Patented Apr. 11, 1961

2,978,886

UNIVERSAL JOINT

Donald P. Marquis, Saginaw, Mich., assignor to General Motors Corporation, Detroit, Mich., a corporation of Delaware Filed Dec. 29, 1958, Ser. No. 783,536

3 Claims. (Cl. 64—21)

This invention relates to universal joints and more particularly to a double universal joint having means for centering the related parts and a wear takeup feature.

In vehicle drive lines it is becoming more and more usual to supply a double universal joint connecting portions of the drive shaft in order to provide a constant velocity connection between portions of the drive shaft and to permit using a drive shaft of several sections. This allows a great amount of adaptability to the drive line and permits lowering the drive line in the motor vehicle to eliminate the interior drive shaft tunnel. A double Carden type universal joint usually has some sort of positioning means to space the portions of the universal joint and provide torque transmission. In generally available double universal joints, there is a problem in the wearing of the parts of the centering means, limiting the life of the universal joint. When the parts begin to wear, a great amount of vibration and noise is transmitted from one section of the joint to the other and consequently throughout the drive line. The universal joints do not function properly when the parts wear, with the possibility of requiring replacement of the universal joint during the life of the vehicle.

The device in which this invention is embodied comprises a double Carden type universal joint having a ball and socket connection between the universal yoke members. The ball and socket connection is resiliently biased to take up any wear that should occur due to the operation of the universal joint. This eliminates the necessity for replacement of the universal joint due to wear of the parts and eliminates the objectional vibration and noise transmitted through the drive line caused by the wearing parts.

A further feature of the invention is the construction of the universal yoke such that the ball and socket portions are integral with their associated yokes. In such a construction, and with careful design thereof, it is possible to assemble the joint sections and eliminate the attaching bolts. Elimination of parts obviously lowers the cost of the design and the structure is stronger because of the absence of bolts. Further, the diameter of swing can be reduced and the location of the ball center can be assured. There is no possibility of a gap between the yoke and the portion carrying the ball or socket connection and there is no diametral squeeze on the bearing cup within the universal yoke.

The construction provides a much more economical universal joint and one that functions properly for a longer period of time. In addition, the one piece construction provides a stronger and better joint at a decreased cost.

In the drawing, the figure shows a double universal joint with parts broken away and in section to illustrate the location of the various parts. The joint is shown with one yoke section conventionally constructed of two pieces and the other yoke section of integral construction, to illustrate the advantages of one over the other.

Referring more particularly to the drawing, the universal joint is shown as having two yoke members, illustrated generally by the numerals 10 and 12. A connecting portion 14 and a connecting portion 16 extend from the yoke members 10 and 12, and connect to the portions of the drive shaft. The yoke member 10 is illustrated as having a portion 18 to which is connected the clamping portion 20. The clamping portion contains the ball member, illustrated generally by the numeral 22 and which will be more fully described below. A pair of abutting flanges 24 and 26, one on each of the portions 18 and 20, provide the means for connecting the two portions, the bolts 28 and nuts 30 securing the parts together.

The yoke member 12 is shown as integrally constructed with respect to the socket portion, indicated generally by the numeral 32 and which will be more fully described below.

The usual trunnion and bearing assemblies are secured in the yoke members 10 and 12 and consist generally of a trunnion member 34 having four shaft extensions 36 extending therefrom and at right angles with respect to each other. A bearing cup 38 is received over each of the shaft portions 36 and is separated from the shaft portions by an annulus of needle bearings 40. Thus, the bearing cup is allowed relatively frictionless rotation about the shaft extension 36 to permit relative rotation between the yoke members 10 and 12.

A retainer assembly is received about the shaft extension 36 to seal the needle bearings 40 and retain the annulus of bearings during assembly. An outer ring 42 is received about the shaft extension, locating on the shoulder 44 and overlapping the inner ring 43. The inner ring seats in an annular groove 46 formed in the end of the bearing cap 38, allowing for retention of the bearing annulus when the bearing cap and the needle bearings are separated from the shaft extension 36. A washer 45, made of cork or the like, is secured against the shaft extension by the inner ring, thus effectively sealing the bearings.

The bearing cups 38 are received in the yoke members 10 and 12 and retained therein by a retaining ring 49. An annular groove 50 in the interior surface of the yoke member 12, and an annular external groove 52 in the bearing cap receive the ring 49. The ring is of the conventional type having an opening 54 formed therein allowing the ring to expand and contract about the bearing cup 38. The bearing cups are thus retained from radial outward movement with respect to the universal members 10 and 12.

In order to connect the two yoke members 10 and 12, an H-shaped connecting member 56 receives the right angled shaft portions 36 extending from the trunnions 34 located in each of the yokes 10 and 12. The connecting member 56 has four flanges 58 extending axially from the central cross portion 60, the flanges having openings 62 therein to receive the bearing cups 38 located on the extensions. The means for securing the bearing cups in the flanges 58 is the same as that securing the bearing cups in the yoke members. A central opening 64 in the cross portion 60 provides room for angular movement of the ball and socket connection 22 and 32 connecting the yoke members 10 and 12.

The yoke member 12 has a tubular extension 66 extending inwardly therefrom and into the opening 64 in the cross portion 60 of the coupling member 56. The extension 66 is an integral portion of the yoke member 12. The ball portion of the ball and socket connection comprises a stub shaft 68 extending inwardly from the yoke member 10, and may be an integral portion thereof, and has a spherical ball 70 formed on the end thereof. The ball 70 extends into the tubular extension 66 and engages socket block portions 72 and 73. The block portions have a cavity therein of a toric contour, establishing line contact between the ball 70 and the block portions 72 and 73. The line contact is established near the greatest diameter of the ball 70 providing better contact between the members when stressed.

The socket block portions 72 and 73 are slidable in the tubular extension 66 and held in engagement with the ball member by the spring 76. The spring is biased against a plate 78, secured in an annular groove 80 formed in the yoke member 12 at the end of the tubular extension 66. It may be seen that the spring 76 will bias the block portions 72 and 73 into engagement with the ball 70 as wear occurs between the parts.

A rounded portion 81 formed on the inward end of the tubular extension 66 receives a shield, or seal member, 82 which is engaged on the stub shaft 68. The purpose of the seal is to prevent dirt and foreign matter from interfering with the engaging surfaces of the ball 70 and socket block 72.

In viewing the drawing, it may be seen that the center line 84 of the yoke member 10 and the stub shaft 68 and ball 70 intersects the center line 86 of the yoke member 12 and the tubular extension, the intersection being at the center 88 of the ball member 70. It may further be seen that the center 88 of the ball member is midway between the yoke members 10 and 12, such that the angular velocity of one yoke member will be the same as the angular velocity of the other yoke member at one position of angularity. At the remaining angle, the universal joint is substantially constant, having the commercial virtues of a constant velocity joint, although in a technical sense the joint is not true constant velocity.

I claim:

1. A universal joint comprising first and second yoke members, a trunnion and bearing assembly rotatably secured in each of said yoke members, a connecting member secured to said trunnion and bearing assemblies to transmit torque from one of said yoke members to the other of said yoke members, a spherically ended extension extending from said first yoke member toward said second yoke member and axially disposed with respect thereto, a tubular extension formed from said second yoke member and axially extending therefrom to enclose said spherically ended extension on said first yoke member, a two piece block having a cavity of toric contour formed therein disposed in said tubular extension of said second yoke member and in engagement with said spherically ended extension, said spherically ended extension having line contact engagement with said two piece block, and resilient means disposed in said tubular extension to bias said block against said spherically ended extension to take up wear caused by the rotation of spherically ended extension in said block, said yoke members being angularly rotatable about the center of the sphere on said spherically ended extension.

2. In a universal joint the combination of first and second yoke members, a trunnion and bearing assembly received in each of said yoke members, a connecting member received about said trunnion and bearing assemblies to connect said yoke members, and positioning means for said yoke members, said positioning means comprising a stub shaft axially extending from said first yoke member toward said second yoke member, a ball portion formed on the end of said stub shaft, the center of said ball portion being midway between said yoke members, a tubular shaft axially extending from said second yoke member and about said ball portion, a pair of separable members forming a block having a cavity of non-spherical curvilinear contour therein and carried in said tubular shaft, said cavity receiving said ball portion, and resilient means in said tubular shaft abutting said block to retain said block in engagement with said ball portion and to advance said block toward said ball portion when said ball portion or said block wears due to rotation therebetween.

3. In a universal joint having a pair of yoke members connected by an intermediate torque transmitting member, a positioing and wear takeup means comprising a tubular shaft extending axially from one of said yoke members, block means slidable in said tubular shaft and having a toroidal cavity formed therein, said cavity having a non-spherical curvilinear surface, a stub shaft axially extending from the other of said yoke members, a ball portion formed on the end of said stub shaft and received in said tubular shaft and engaged in said toroidal cavity in said block, said ball portion having line contact engagement with said non-spherical curvilinear surface, resilient means in said tubular shaft and acting on said block to maintain said block in engagement with said ball portion and locate said one yoke member with respect to said other yoke member.

References Cited in the file of this patent

UNITED STATES PATENTS

| | | |
|---|---|---|
| 1,951,197 | Milligan | Mar. 13, 1934 |
| 1,979,768 | Pearce | Nov. 6, 1934 |
| 1,987,807 | Swenson | Jan. 15, 1935 |
| 2,042,513 | Daniell | June 2, 1936 |
| 2,255,762 | Dodge | Sept. 16, 1941 |